US011984277B2

(12) United States Patent
Suzuki et al.

(10) Patent No.: US 11,984,277 B2
(45) Date of Patent: May 14, 2024

(54) PUSH SWITCH

(71) Applicant: ALPS ALPINE CO., LTD., Tokyo (JP)

(72) Inventors: Takuya Suzuki, Miyagi (JP); Izuru Sadamatsu, Tokyo (JP); Katsutoshi Usui, Miyagi (JP); Shinya Makino, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/652,740

(22) Filed: Feb. 28, 2022

(65) Prior Publication Data

US 2022/0230821 A1 Jul. 21, 2022

Related U.S. Application Data

(63) Continuation of application No. PCT/JP2020/011771, filed on Mar. 17, 2020.

(30) Foreign Application Priority Data

Sep. 2, 2019 (JP) ................................ 2019-159864

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01)

(58) Field of Classification Search
CPC .. H01H 13/14; H01H 13/20; H01H 2203/038; H01H 2205/028;

(Continued)

(56) References Cited

U.S. PATENT DOCUMENTS 4,931,605 A * 6/1990 Zoller .................... H01H 13/06 200/406
2006/0201797 A1* 9/2006 Rastemborski ........ H01H 13/48 200/516

(Continued)

FOREIGN PATENT DOCUMENTS

JP S60-026137 U 2/1985
JP 2015-084302 4/2015

(Continued)

OTHER PUBLICATIONS

International Search Report for PCT/JP2020/011771 mailed on Jun. 9, 2020.

*Primary Examiner* — Lheiren Mae A Caroc
(74) *Attorney, Agent, or Firm* — IPUSA, PLLC

(57) ABSTRACT

A push switch contains a case including a housing space having an upper-opening and including fixed-contacts disposed on a bottom of the housing space, a movable contact member disposed in the housing space configured to deform in response to receiving pressure applied from above, and contacting the fixed-contacts upon defoming in response to the received pressure, and a pushing member disposed on the movable contact member and configured to transmit the received pressure to the movable contact member. The movable contact member includes a pair of first-linear edges, wherein the pushing member includes a plurality of projecting-pressing portions disposed on a bottom surface of the pushing member facing the movable contact member, and wherein the plurality of pressing portions is disposed on the bottom surface at positions not overlapping a straight-line that passes through a center of the movable contact member and intersecting each of the pair of first-linear edges.

9 Claims, 11 Drawing Sheets

(58) Field of Classification Search
CPC .. H01H 2221/05; H01H 13/705; H01H 13/52; H01H 3/12; H01H 5/00; H01H 5/04; H01H 5/045; H01H 5/30; H01H 13/22; H01H 13/26; H01H 13/48; H01H 13/50; H01H 2215/004; H01H 2215/014; H01H 2215/016; H01H 2215/034; H01H 2215/036; H01H 2221/036; H01H 2221/044; H01H 2227/022; H01H 2227/026
See application file for complete search history.

(56) References Cited

U.S. PATENT DOCUMENTS

| | | | | |
|---|---|---|---|---|
| 2018/0218856 | A1 | 8/2018 | Ito et al. | |
| 2021/0335558 | A1* | 10/2021 | Kaneko .................. | H01H 13/04 |

FOREIGN PATENT DOCUMENTS

| | | |
|---|---|---|
| JP | 2018-006021 | 1/2018 |
| WO | 2017/018097 | 2/2017 |

* cited by examiner

PUSH SWITCH

CROSS-REFERENCE TO RELATED APPLICATION

This U.S. non-provisional application is a continuation of PCT International Application PCT/JP2020/011771 filed on Mar. 17, 2020 and designated the U.S., which is based on and claims priority to Japanese Patent Applications No. 2019-159864 filed Sep. 2, 2019, with the Japan Patent Office. The entire contents of these applications are incorporated herein by reference.

BACKGROUND OF THE INVENTION

1. Field of the Invention

The present invention relates to a push switch.

2. Description of the Related Art

Patent Document 1 relates to a push switch and discloses a technique in which a pushing member disposed between a cover sheet and a movable contact member presses a top portion of the movable contact member to deform the movable contact member, thereby allowing the movable contact member to contact a central contact portion.

[Patent Document 1] Japanese Patent Application Laid-Open No. 2018-6021

SUMMARY OF THE INVENTION

However, in the technique disclosed in Patent Document 1, both sides of the movable contact member are side-cut. Therefore, if an operational load of the movable contact member is increased without increasing the size of the movable contact member, the stress amplitude of both sides of the movable contact member increases, and cracks are likely to occur on both sides of the movable contact member.

A push switch of an aspect of the invention contains a case including a housing space having an upper opening and including fixed contacts disposed on a bottom of the housing space, a movable contact member disposed in the housing space configured to deform in response to receiving pressure applied from above, and contacting the fixed contacts upon defoming in response to the received pressure, and a pushing member disposed on the movable contact member and configured to transmit the received pressure to the movable contact member, wherein the movable contact member includes a pair of first linear edges, wherein the pushing member includes a plurality of projecting pressing portions disposed on a bottom surface of the pushing member facing the movable contact member, and wherein the plurality of pressing portions is disposed on the bottom surface at positions not overlapping a straight line that passes through a center of the movable contact member and intersecting each of the pair of first linear edges.

According to one embodiment, an operational load of the movable contact member can be increased while suppressing the increase in stress amplitude on both sides of the movable contact member.

DESCRIPTION OF THE PREFERRED EMBODIMENTS

Figure 1:
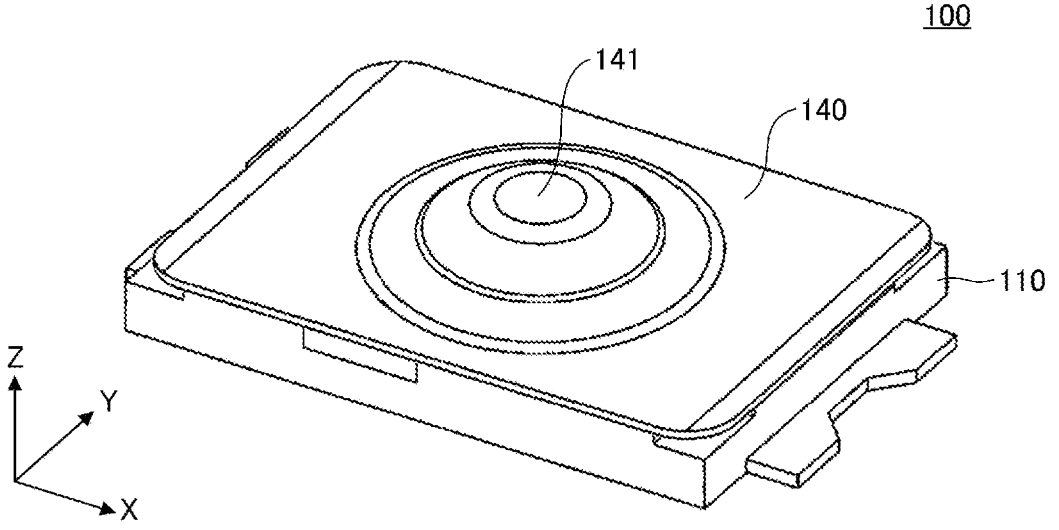
FIG. 1 is a perspective view of a push switch according to one embodiment.

Hereinafter, one embodiment will be described with reference to the drawings. In the following description, for convenience, the Z-axis direction in the drawing is vertically oriented. In addition, the Y-axis direction in the drawing is the left-right direction. In addition, the X-axis direction in the drawings is the front-rear direction.

[Outline of Push Switch 100]

FIG. 1 is a perspective view of a push switch 100 according to an embodiment. As illustrated in FIG. 1, the push switch 100 includes a case 110 having a rectangular shape that is thin in the Z-axis direction. A cover sheet 140 is provided on the upper surface of the case 110. At the center of the cover sheet 140 is an upwardly projecting dome-like operating member 141.

The push switch 100 can be switched between an on state and an off state by pressing the operating member 141 downward. Specifically, the push switch 100 is turned off when the operating member 141 is not pressed, and a first fixed contact 111 (see FIG. 2) and a second fixed contact 112 (see FIG. 2) provided inside the case 110 are turned off.

Figure 2:
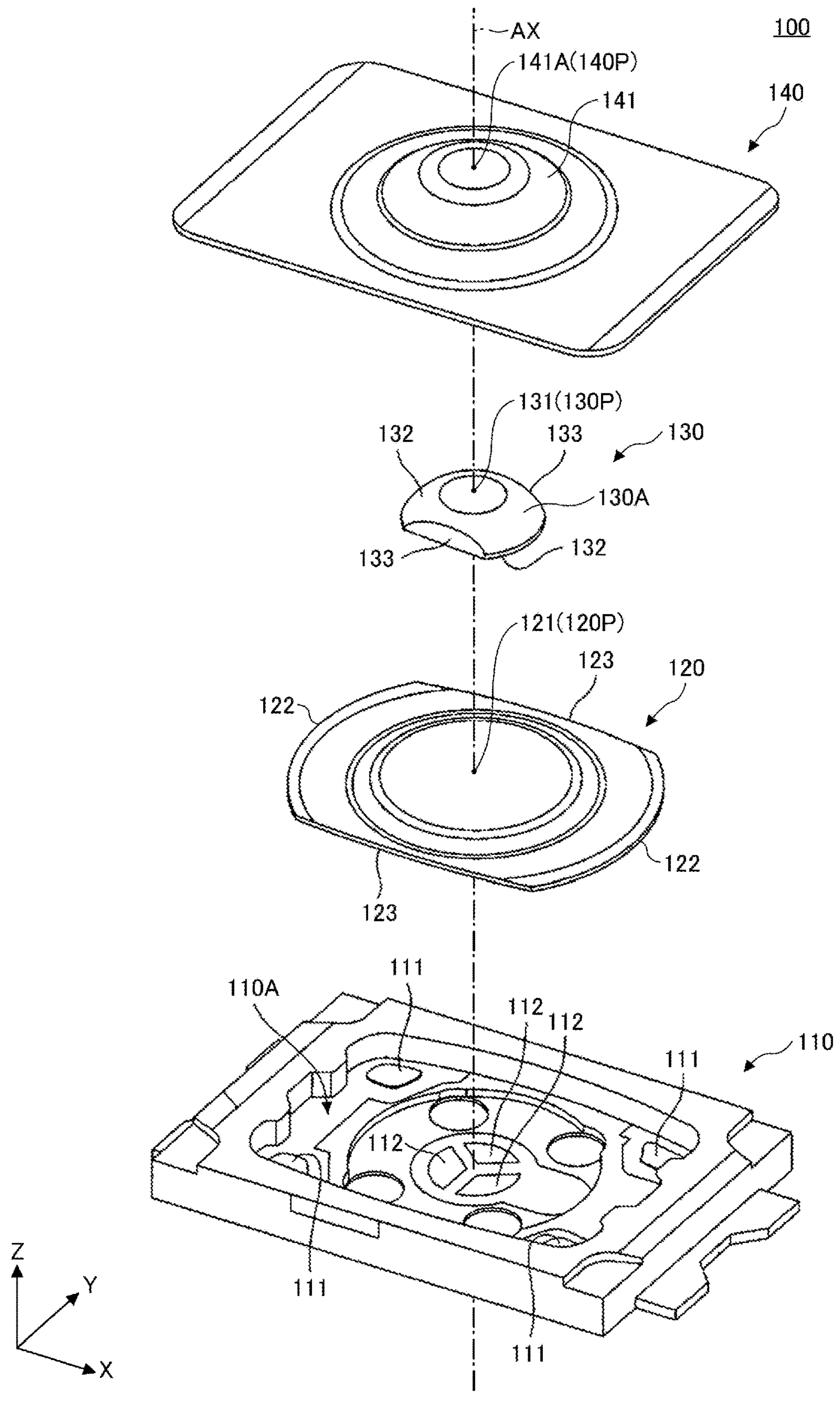
FIG. 2 is an exploded perspective view of a push switch according to one embodiment.

Meanwhile, the push switch 100 is turned on when the operating member 141 is pressed downward, and the first fixed contact 111 and the second fixed contact 112 are connected to each other through a metal contact 120 (see FIG. 2). When the push switch 100 is released from the pressing operation of the operating member 141, the push switch 100 automatically returns to its original state due to the resilient restoring force of the metal contact 120. This automatically turns off the push switch 100.

[Configuration of Push Switch 100]

FIG. 2 is an exploded perspective view of the push switch 100 according to an embodiment. As illustrated in FIG. 2, the push switch 100 is configured with the case 110, metal contact 120, pushing member 130, and cover sheet 140, starting from the bottom of the drawing.

The case 110 is a container-like member having a rectangular shape. The case 110 is a generally rectangular shape with a longitudinal direction in the X-axis direction and a shorter direction in the Y-axis direction in a planar view from above. The case 110 is formed with an opening in the upper portion of a housing space 110A. The housing space 110A is a generally rectangular shape with a longitudinal direction in the X-axis direction and a shorter direction in the Y-axis direction in a planar view from above. Within the housing space 110A is the metal contact 120 and the pushing member 130. For example, the case 110 is formed by insert molding using a relatively rigid insulating material (for example, a rigid resin and the like).

A bottom portion of the housing space 110A is provided with four first fixed contacts 111 and three second fixed contacts 112. The four first fixed contacts 111 are disposed at each of the four corners at the bottom of the housing space 110A. Each of the four first fixed contacts 111 contacts the periphery of the metal contact 120 and is electrically connected to the metal contact 120 by positioning the metal contact 120 in the housing space 110A. The three second fixed contacts 112 are disposed in the center of the bottom portion of the housing space 110A. The three second fixed contacts 112 are electrically connected to the metal contact 120 by contacting the center (for example, the back portion of the top) of the metal contact 120 when the top of the metal contact 120 is deformed in a concave manner. Thereby the three second fixed contacts and the metal contact 120 are electrically connected, and are conductive with each of the four first fixed contacts 111 through the metal contact 120. For example, the first fixed contacts 111 and the second fixed contacts 112 are formed by processing a metal plate.

The metal contact 120 is an example of a "movable contact member". The metal contact 120 is a dome-shaped member formed from a thin metal plate. The metal contact 120 is disposed within the housing space 110A of the case 110.

The outer shape of the metal contact 120 is configured with a pair of first curved edges 122 on the front and rear sides and a pair of first linear edges 123 on the left and right sides in a planar view from above. The first curved edge 122 is a portion that extends curvedly along a circumferential portion having a predetermined radius. The first linear edge 123 is a portion that extends linearly along the X-axis direction. The metal contact 120 is shaped into an outer shape having a pair of first curved edges 122 and a pair of first linear edges 123 by being side-cut linearly along the X-axis of the left and right sides of the metal contact 120 relative to a member having a circular shape in a planar view from above. That is, the metal contact 120 has a longitudinal shape in which the X-axis direction is the longitudinal direction and the Y-axis direction is the shorter direction.

The metal contact 120 contacts with each of the four first fixed contacts 111 at the bottom of the housing space 110A and is electrically connected to each of the four first fixed contacts 111 at its outer periphery. When the operating member 141 is pressed, the top 121 of the metal contact 120 is pressed downwardly by the pushing member 130, and abruptly deforms (inverts) the top 121 in a concave shape when it exceeds a predetermined operating load.

Thus, the back portion of the top 121 in the metal contact 120 contacts the second fixed contacts 112 disposed on the bottom of the housing space 110A, and is electrically connected to the second fixed contacts 112. The metal contact 120 returns to its original projecting shape by elastic force when released from the pressing force from the pushing member 130.

The pushing member 130 is mounted on the top 121 (for example, center part) of the metal contact 120. The pushing member 130 is formed of a resin material such as PET and the like. The upper surface of the pushing member 130 is upwardly projecting dome-shaped with a central top 131. The pushing member 130 is bonded by any adhesive methods (for example, laser welding and the like) with respect to the back of a top 141A of the operating member 141 of the cover sheet 140.

The outer shape of the pushing member 130 is configured by a pair of second curved edges 132 on the front and rear sides and a pair of second linear edges 133 on the left and right sides in a planar view from above. The second curved edge 132 is a portion that extends curvedly along a circumferential portion having a predetermined radius. The second linear edge 133 is a portion that extends linearly along the X-axis direction. A pair of the second linear edges 133 are parallel to a pair of the first linear edges 123 of the metal contact 120. The pushing member 130 is shaped into an outer shape having a pair of second curved edges 132 and a pair of second linear edges 133 by being side-cut linearly along the X-axis with respect to a member having a circular shape in a planar view from above. That is, the pushing member 130 has a longitudinal shape in which the X-axis direction is the longitudinal direction and the Y-axis direction is the shorter direction.

The cover sheet 140 is a thin sheet-like member mounted on the top surface of the case 110. The cover sheet 140 is formed of a resin material such as PET and the like. The cover sheet 140 is a generally rectangular shape with a longitudinal direction in the X-axis direction and a shorter direction in the Y-axis direction in a planar view from above. That is, the cover sheet 140 is a shape substantially the same as the case 110 in a planar view from above. The cover sheet 140 is bonded to the upper surface of the case 110 by any bonding methods (for example, laser welding and the like) while covering the upper surface of the case 110. The cover sheet 140 seals the housing space 110A by closing the upper opening of the housing space 110A of the case 110. At the center of the cover sheet 140 is an upwardly projecting dome-like operating member 141. The operating member 141 is the part where the operating portion performs a downward pressing operation.

A center 120P (top 121) of the metal contact 120, a center 130P (top 131) of the pushing member 130, and a center 140P (top 141A) of the cover sheet 140 overlap each other on an axis AX.

(Configuration of Bottom Surface of Pushing Member 130)

Figure 3:
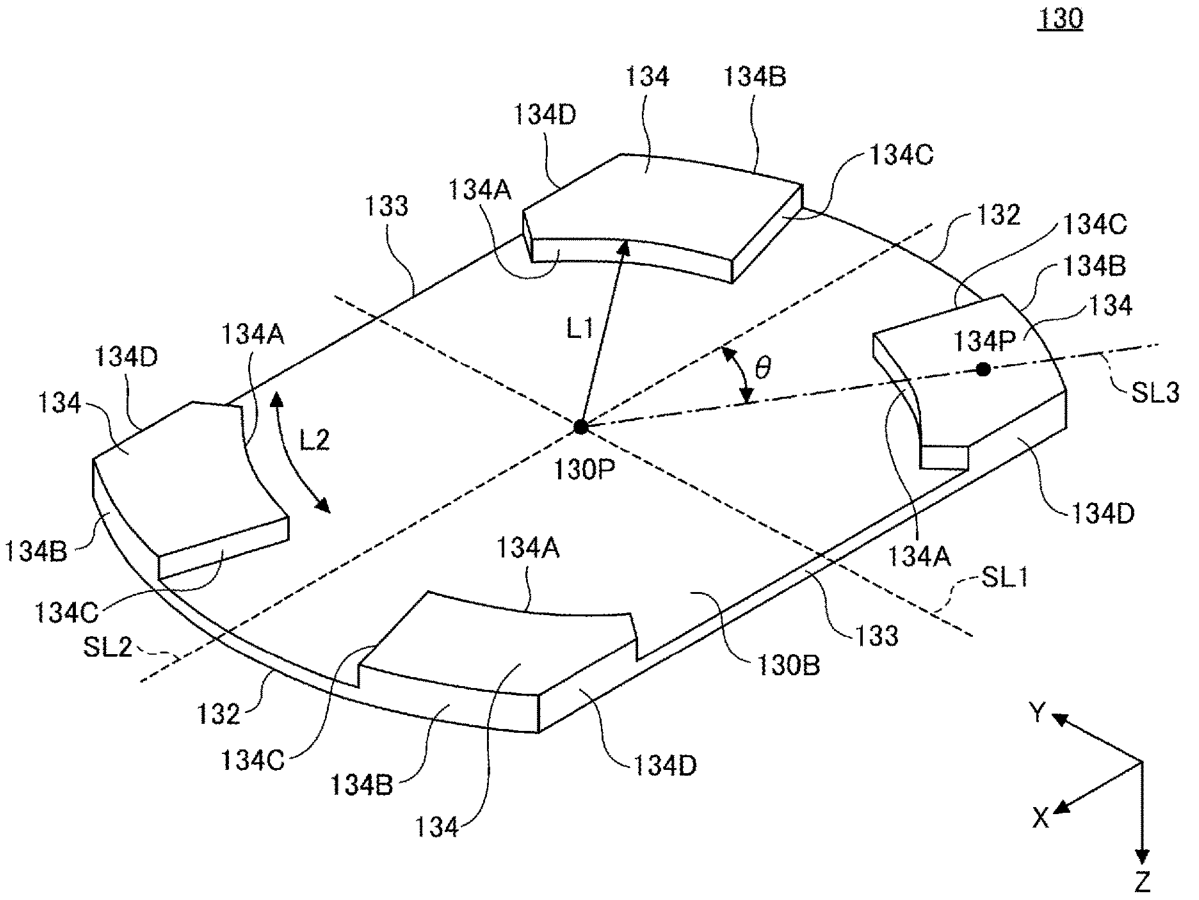
FIG. 3 is a perspective view of a bottom surface side of a pushing member according to one embodiment.

FIG. 3 is a perspective view of the bottom surface of the pushing member 130 of an embodiment. As illustrated in FIG. 3, a bottom surface 130B of the pushing member 130 is planar.

As illustrated in FIG. 3, the pushing member 130 of the present embodiment is provided with each of the four pressing portions 134 with respect to each of the four corners of the bottom surface 130B. In particular, the four pressing portions 134 are symmetrically disposed with respect to the center 130P of the pushing member 130 (that is, the center 120P of the metal contact 120).

Each pressing portion 134 protrudes downwardly from the bottom surface 130B. Each pressing portion 134 has a predetermined height from the bottom surface 130B. The bottom surface of each pressing portion 134 is planar.

A straight line SL1 illustrated in FIG. 3 is a line extending in the Y-axis direction through the center 130P of the pushing member 130 and orthogonal to each of the pair of the second linear edges 133. A straight line SL2 illustrated in FIG. 3 is a line extending in the X-axis direction through the center 130P of the pushing member 130 and is a straight line parallel to each of the pair of the second linear edges 133.

As illustrated in FIG. 3, at the bottom surface 130B, each of the four pressing members 134 is provided in each of the four corners so that each of the four pressing members 134 does not overlap the straight line SL1.

Each pressing portion 134 has an inner circumferential surface 134A, an outer circumferential surface 134B, a side 134C, and a side 134D. The inner circumferential surface 134A is a side extending along the circumference of a circle having a radius L1 centered on a center 130P of the pushing member 130. The outer circumferential surface 134B is a side extending along the curved edge 132. The side 134C is a side extending along a line at a predetermined angle with respect to the straight line SL2, and the line passes through the center 130P of the pushing member 130. The side 134D is a side extending along the second linear edge 133.

[Pressing Position of Metal Contact 120 by Pushing Member 130]

Figure 4:
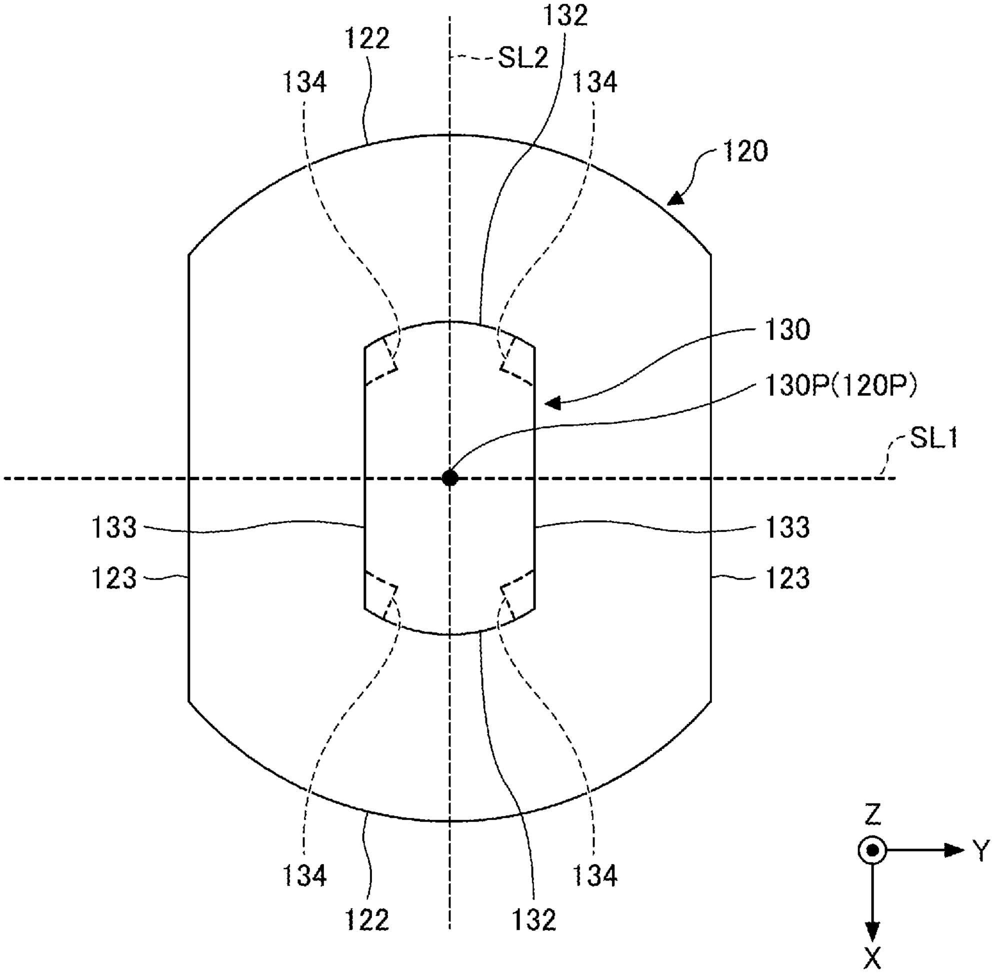
FIG. 4 is a planar view of a pressing position of a metal contact by the pushing member according to one embodiment.

FIG. 4 is a planar view illustrating the pressing position of the metal contact 120 by the pushing member 130 of an embodiment. FIG. 4 illustrates a stacked pushing member 130 and the metal contact 120.

As illustrated in FIG. 4, the pushing member 130 is provided on the top 121 of the metal contact 120 so that the pair of the second linear edges 133 of the pushing member 130 and the pair of the first linear edges 123 of the metal contact 120 are parallel to each other.

In addition, as illustrated in FIG. 4, the pushing member 130 can press a position farther away in the X-axis direction from the straight line SL1 (a line passing through the center 130P and the midpoint of the first linear edges 123), that is, a position not overlapping the straight line SL1, against the metal contact 120 by each of the four pressing portions 134 provided in each of the four corners.

Thus, the push switch 100 of the present embodiment can push the metal contact 120 by the pushing member 130 so that an increase in the stress amplitude of the first linear edge 123 in the metal contact 120 is suppressed even when the operational load of the metal contact 120 is increased.

[Operational Load of Metal Contact 120]

In the push switch 100 of the present embodiment, the operational load of the metal contact 120 varies according to the distance L1 (radius L1) from the center 130P of the pushing member 130 to the inner circumferential surface 134A of the pressing portion 134, the length L2 of the inner circumferential surface 134A, and the angle θ of the straight line SL3 with respect to the straight line SL2 as illustrated in FIG. 3. The straight line SL3 is a line connecting the center 130P of the pushing member 130 and the center 134P of the pressing portion 134. Thus, the push switch 100 of the present embodiment can set the operational load of the metal contact 120 to a target value by properly adjusting the distance L1, the length L2, and the angle θ in the pushing member 130.

Figure 5A:
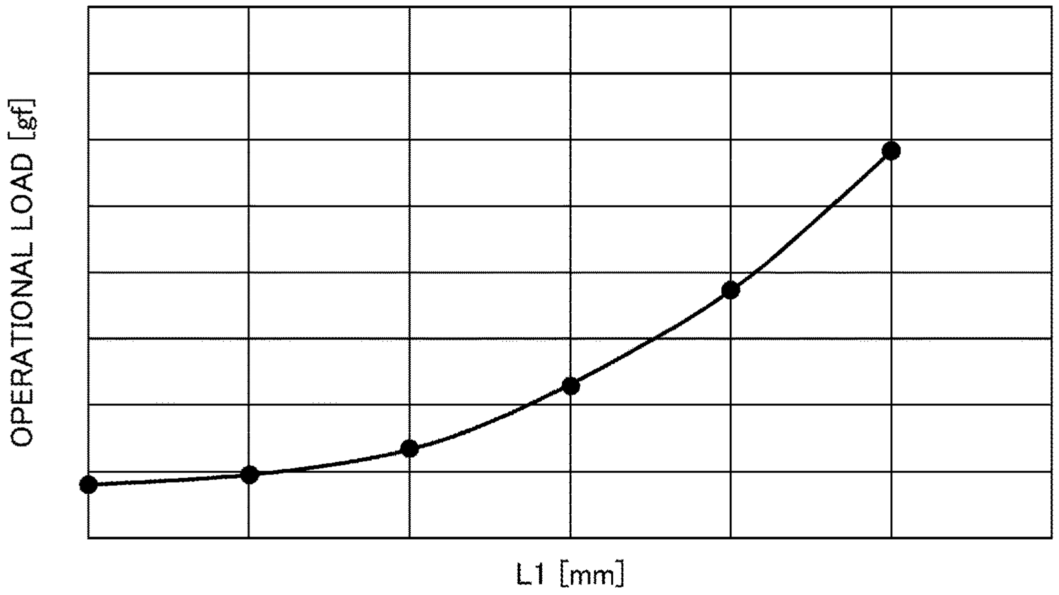
FIG. 5A is a diagram illustrating a relationship between distances and operational loads in the push switch according to one embodiment.
Figure 5B:
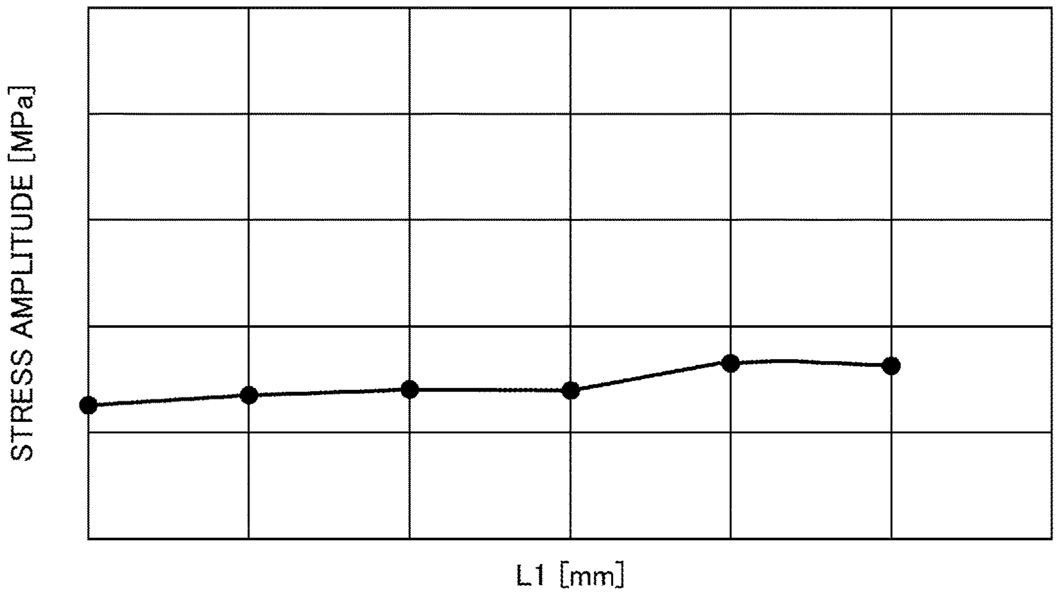
FIG. 5B is a diagram illustrating a relationship between the distances and stress amplitudes in the push switch according to one embodiment.

FIG. 5 is a diagram illustrating the relationship of distance L1, operating loads, and stress amplitudes in the push switch 100 according to an embodiment. For example, the push switch 100 in the present embodiment can increase the operational load of the metal contact 120 by increasing the distance L1 in the pushing member 130, by "the principle of leverage", as illustrated in FIG. 5A. Even in this case, the push switch 100 of the present embodiment is less likely to increase the stress amplitude of the first linear edge 123 of the metal contact 120, as illustrated in FIG. 5B.

Figure 6A:
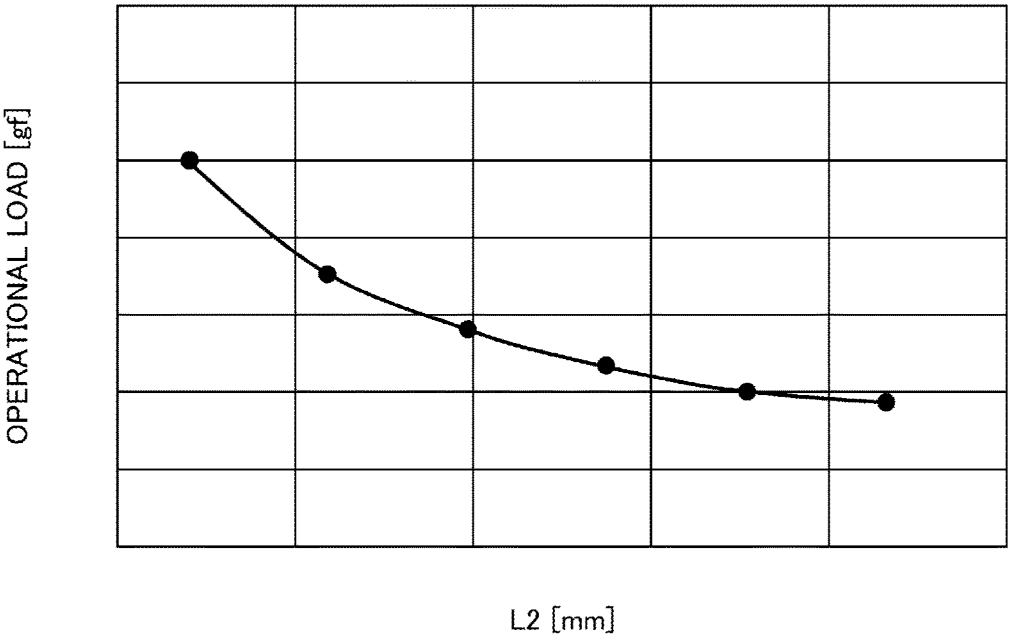
FIG. 6A is a diagram illustrating a relationship between lengths and the operational loads in the push switch according to one embodiment.
Figure 6B:
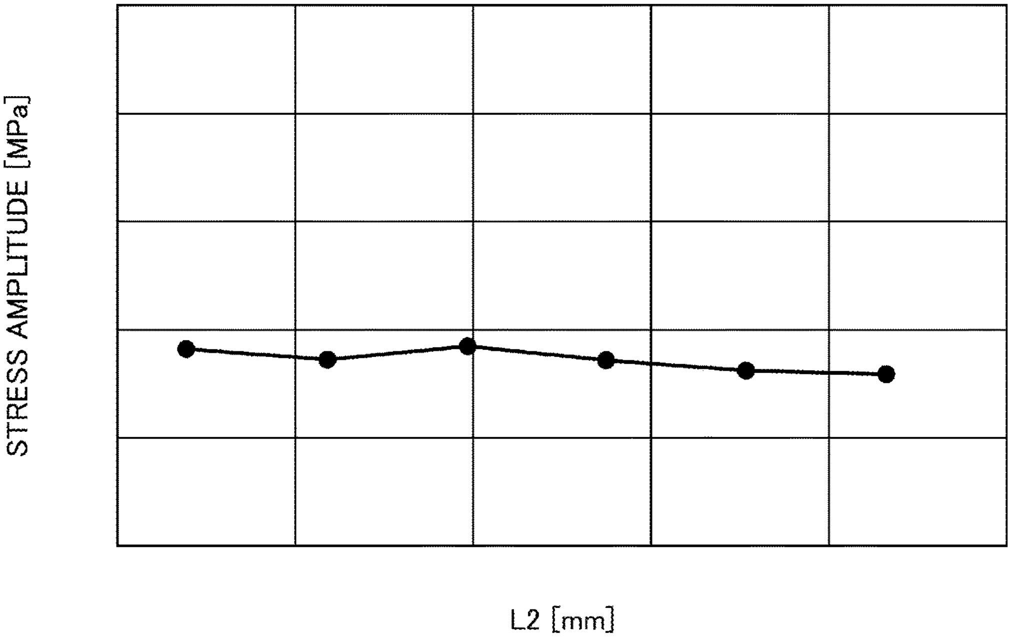
FIG. 6B is a diagram illustrating a relationship between the lengths and stress amplitudes in the push switch according to one embodiment.

FIG. 6 is a diagram illustrating the relationship of the length L2, the operational load, and stress amplitude of the push switch 100 of an embodiment. For example, as illustrated in FIG. 6A, the push switch 100 in the present embodiment can increase the operational load of the metal contact 120 because the length L2 in the pushing member 130 is smaller and the deformation of the portion of the metal contact 120 that is not coming in contact with the pushing member 130 becomes larger. Even in this case, the push switch 100 of the present embodiment is less likely to increase the stress amplitude of the first linear edge 123 of the metal contact 120, as illustrated in FIG. 6B.

Figure 7A:
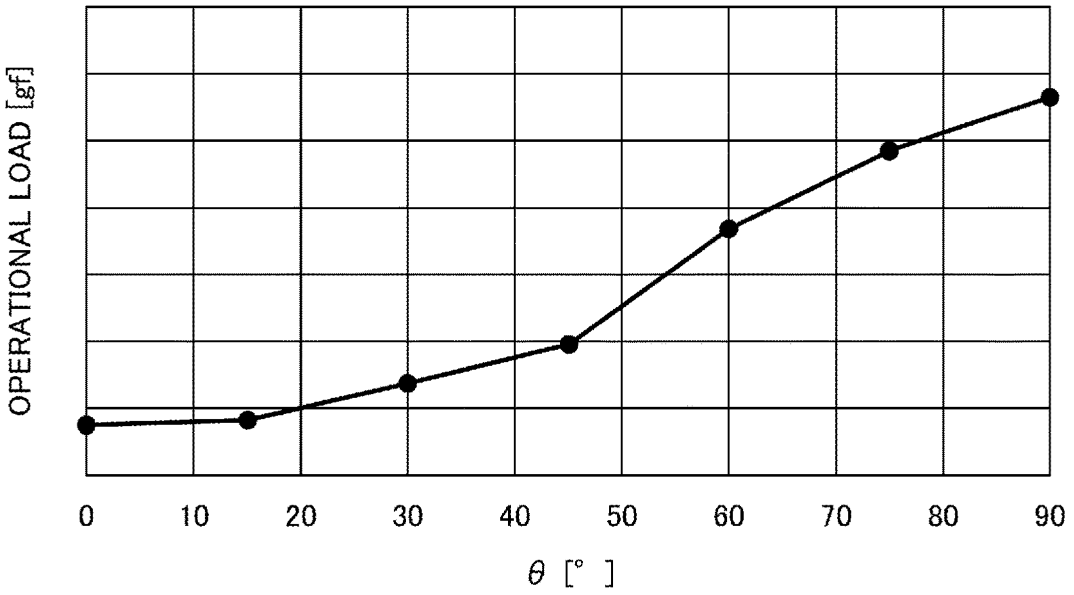
FIG. 7A is a diagram illustrating a relationship between angles and the operational loads in the push switch according to one embodiment.
Figure 7B:
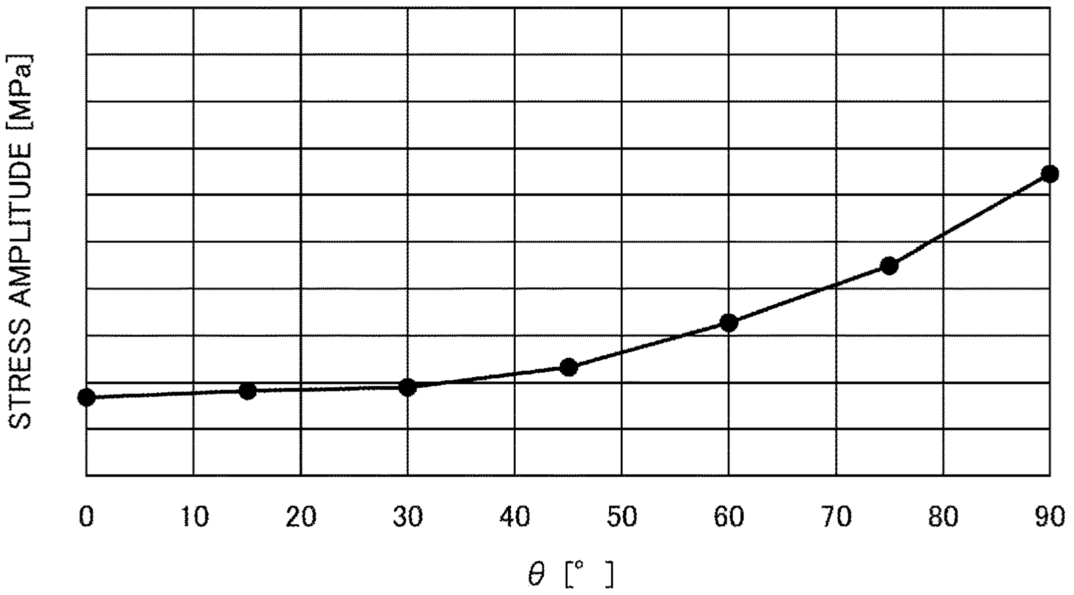
FIG. 7B is a diagram illustrating a relationship between the angles and the stress amplitudes in the push switch according to one embodiment.

FIG. 7 is a diagram illustrating the relationship of the angle θ, the operational load, and stress amplitude in the push switch 100 of an embodiment. For example, as illustrated in FIG. 7A, the push switch 100 in the present embodiment increases the angle θ in the pushing member 130, thereby increasing the amount of sinking near the first linear edge 123 in the metal contact 120. Therefore, the operational load of the metal contact 120 can be increased. Even in this case, the push switch 100 of the present embodiment is less likely to increase the stress amplitude of the first linear edge 123 of the metal contact 120, as illustrated in FIG. 7B.

[First Modification of Pushing Member 130]

Figure 8:
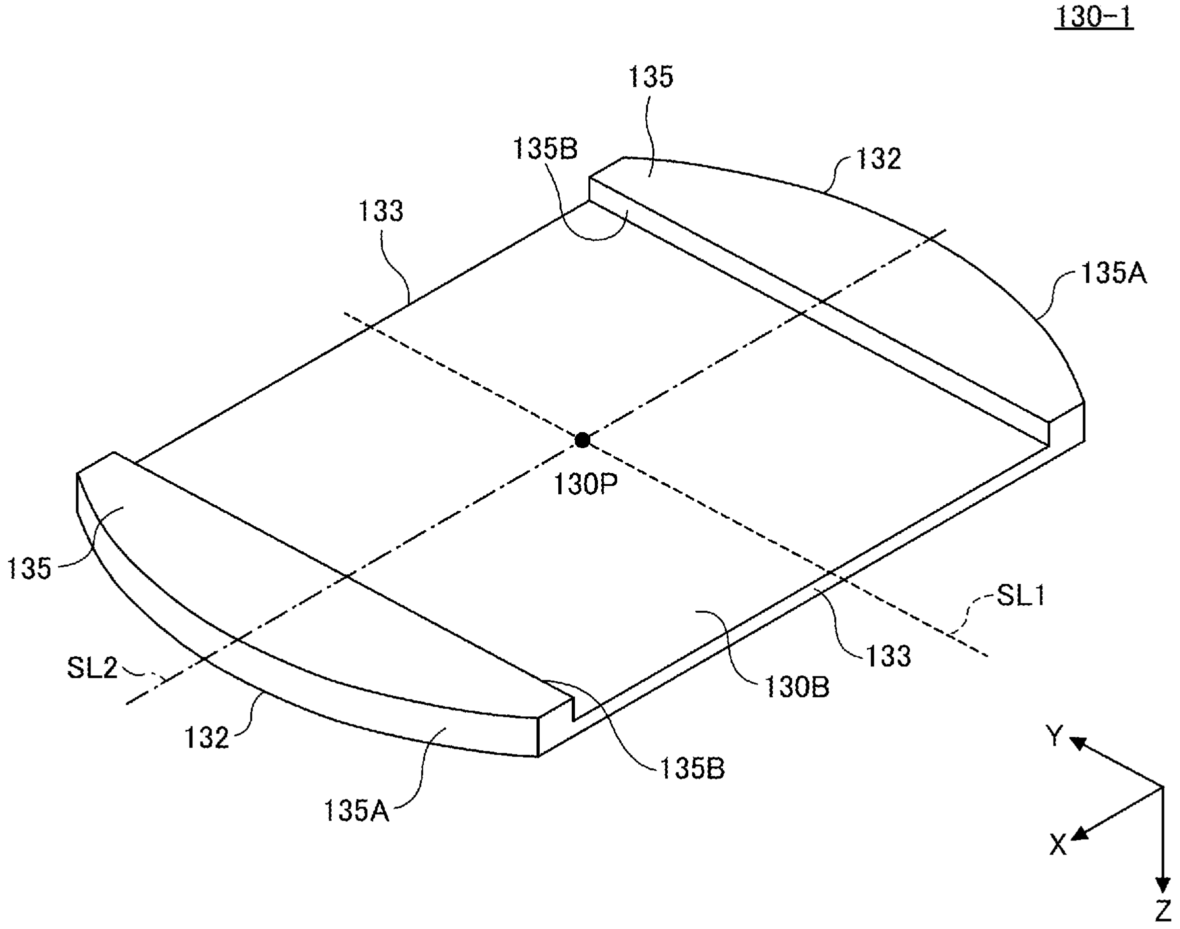
FIG. 8 is a diagram illustrating a first modification example of a pushing member according to one embodiment.

FIG. 8 is a diagram illustrating a first variation of the pushing member 130 of an embodiment. A pair of pressing portions 135 are symmetrically disposed with respect to the center 130P of the bottom surface 130B in the pushing member 130-1 in the first modification illustrated in FIG. 8. Each pressing portion 135 is of longest dimension in the Y-axis direction (axial direction perpendicular to the pair of the second linear edges 133) and extends along the curved edge 132.

Each pressing portion 135 protrudes downwardly from the bottom surface 130B. In addition, each pressing portion 135 has a certain height from the bottom surface 130B. The bottom surface of each pressing portion 135 is planar.

The outer side 135A of each pressing portion 135 is curved along the curved edge 132. The side 135B which is an inner side of each pressing portion (the side facing to the center 130P) is linearly formed in a Y-axis direction. That is, the inner side 135B of one pressing portion 135 and the inner side 135B of the other pressing portion 135 are parallel to each other.

As illustrated in FIG. 8, at the bottom surface 130B, the pair of the pressing portions 135 is provided along the pair of the curved edges 132 so that each of the pair of the pressing portions 135 does not overlap the straight line SL1, each of the curved edges having a corresponding pressing portion of the pressing portions.

Accordingly, the pushing member 130-1 of the first modification example can press a position farther away in the X-axis direction from the straight line SL1 (a line passing through the center 130P and the midpoint of the first linear edges 123), that is, a position not overlapping the straight line SL1, against the metal contact 120 by each of the pair of pressing portions 135.

Thus, the pushing member 130-1 of the first modification example can press the metal contact 120 to suppress an increase in the stress amplitude of the first linear edge 123 of the metal contact 120 even when the operational load of the metal contact 120 is increased.

[Second Modification of Pushing Member 130]

Figure 9:
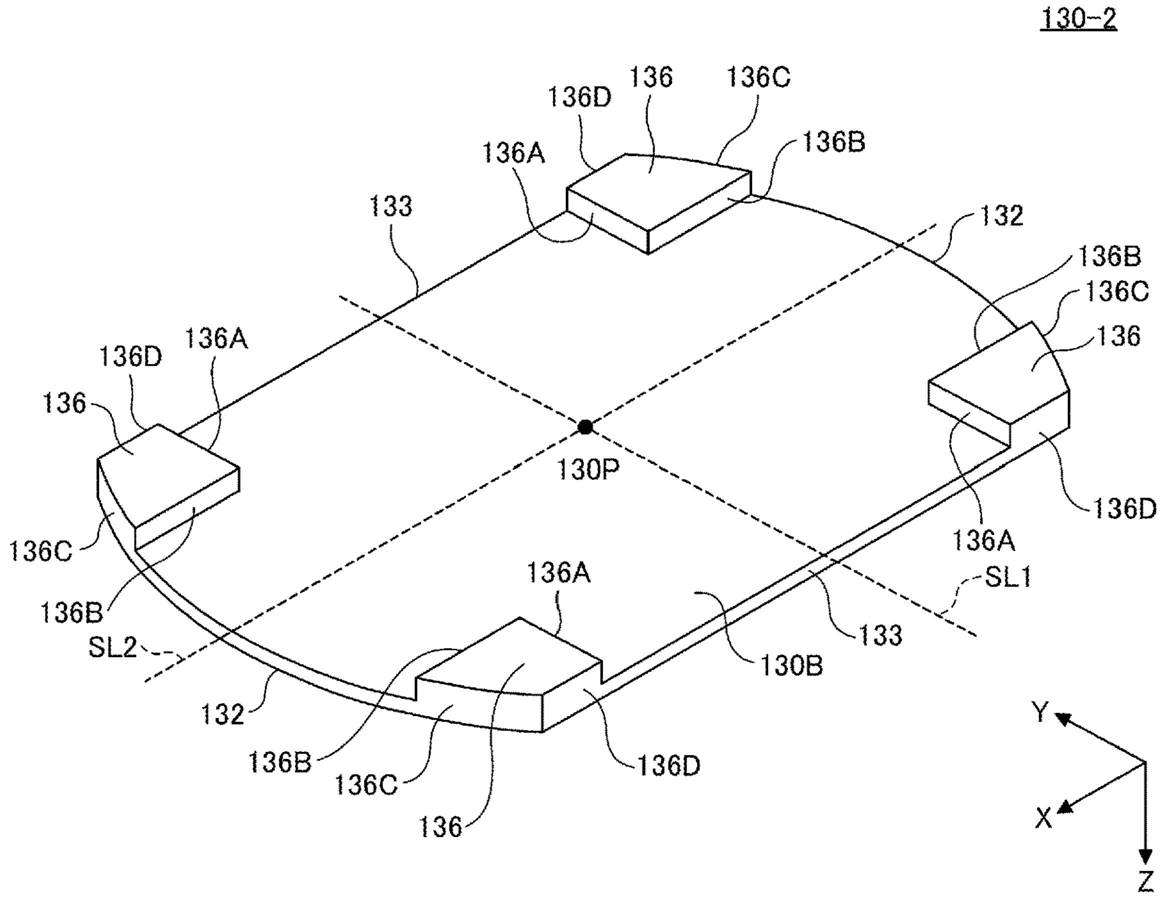
FIG. 9 is a diagram illustrating a second modification example of a pushing member according to one embodiment.

FIG. 9 is a view illustrating a second modification example of the pushing member 130 of an embodiment. The pushing member 130-2 of the second modification example illustrated in FIG. 9 is provided with each of the four pressing portions 136 with respect to each of the four corners of the bottom surface 130B. In particular, four pressing portions 136 are symmetrically disposed with respect to the center 130P of the pushing member 130-2.

Each pressing portion 136 protrudes downwardly from the bottom surface 130B. Each pressing portion 136 also has a certain thickness from the bottom surface 130B. The bottom surface of each pressing portion 136 is planar.

Each of the pressing portions 136 illustrated in FIG. 9 differs in shape from each of the pressing portions 134 illustrated in FIG. 3 in a planar view from above. Each pressing portion 136 has a straight side 136A parallel to the straight line SL1, a straight side 136B parallel to the straight line SL2, a side 136C extending along the curved edge 132, and a side 136D extending along the second linear edge 133.

Therefore, in the pushing member 130-2 of the second modification example, two opposing sides 136A are parallel to each other in the two pressing portions 136 adjacent in the X-axis direction. In addition, in the pushing member 130-2 of the second modification example, two opposing sides 136B are parallel to each other in the two pressing portions 136 adjacent in the Y-axis direction.

Accordingly, the pushing member 130-2 of the second modification example may be processed for linear recessed portions (for example, machining, press machining, and the like) along the straight lines SL1 and SL2 in a region other than the pressing portions 136 with respect to the bottom surface 130B, thereby forming each of the pressing portions 136 relatively easily.

As illustrated in FIG. 9, at the bottom surface 130B, each of the four pressing portions 136 is disposed in each of the four corners so that each of the four pressing portions 136 does not overlap the straight line SL1.

Accordingly, the pushing member 130-2 of the second modification example can press a position farther away in the X-axis direction from the straight line SL1 (a line passing through the center 130P and the midpoint of the first linear edges 123), that is, a position not overlapping the straight line SL1, against the metal contact 120 by each of the four pressing portions 136.

Thus, the pushing member 130-2 of the second modification example can press the metal contact 120 to suppress an increase in the stress amplitude of the first linear edge 123 of the metal contact 120 even when the operational load of the metal contact 120 is increased.

Comparative Example with Conventional Push Switches

Figure 10:
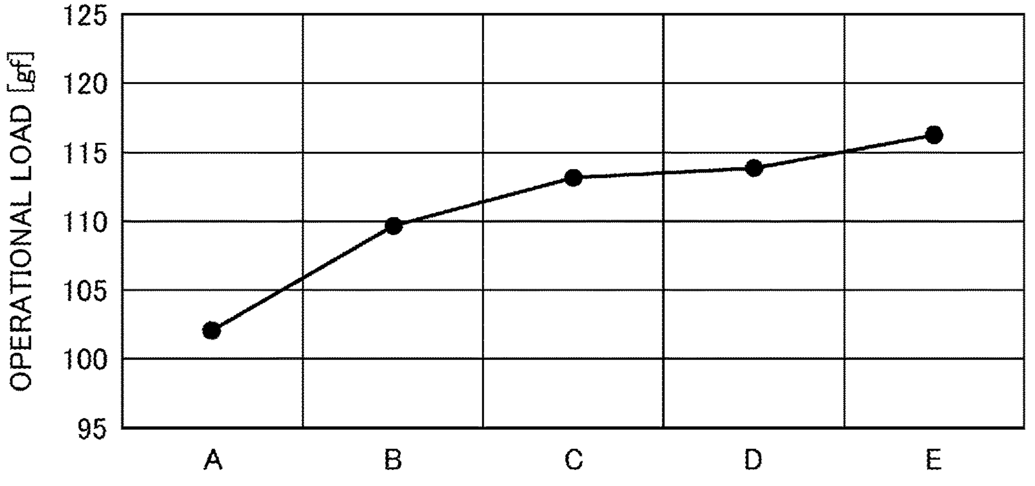
FIG. 10 is a diagram illustrating a comparison of the operational loads of the push switch according to one embodiment and that of conventional push switches.
Figure 11:
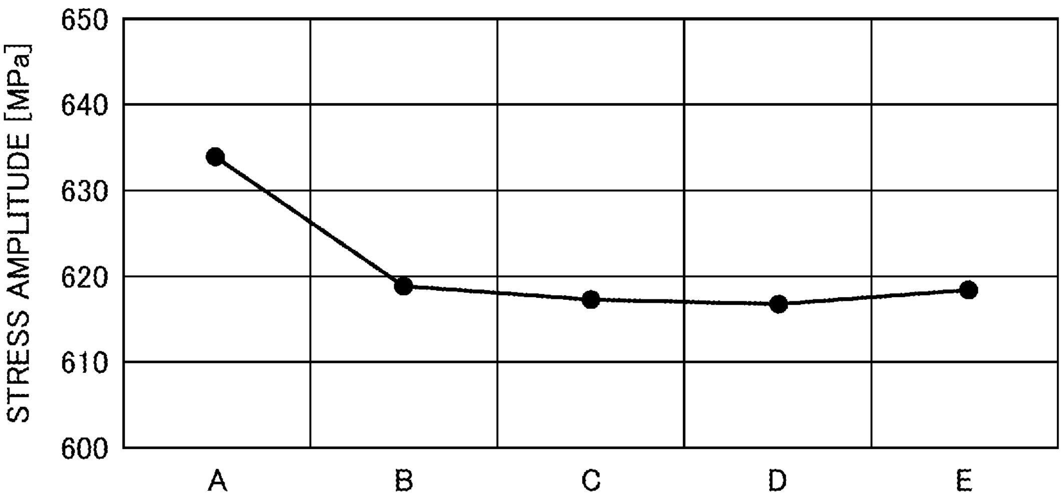
FIG. 11 is a diagram illustrating a comparison of the stress amplitudes of the push switch according to one embodiment and that of the conventional push switches.

FIG. 10 is a diagram illustrating a Comparative Example of an operational load between the push switch 100 of the present embodiment and a conventional push switch. FIG. 11 is a diagram illustrating a Comparative Example of a stress amplitude between the push switch 100 of the present embodiment and a conventional push switch.

In the graph of FIG. 10, the vertical axis indicates the operational load of the metal contact. In the graph of FIG. 11, the longitudinal axis indicates the stress amplitude of both sides of the metal contact. In the graphs of FIGS. 10 and 11, the horizontal axis represents the type of push switch.

Figure 12:
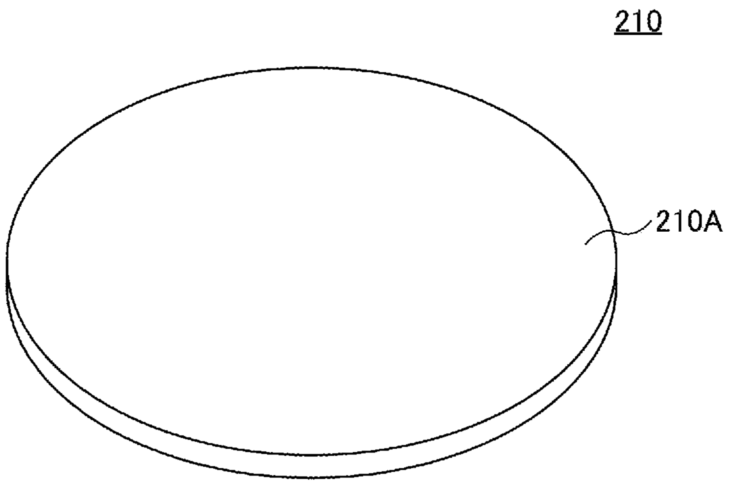
FIG.12 PRIOR ART
FIG. 12 is a diagram illustrating a first example of a pushing member used in the conventional push switch.

Here, "A" is the conventional push switch using a pushing member 210 illustrated in FIG. 12. "B" is the conventional push switch using a pushing member 220 illustrated in FIG. 13. "C" is the push switch 100 of the present embodiment using the pushing member 130 illustrated in FIG. 3. "D" is the push switch 100 of the present embodiment using the pushing member 130-1 illustrated in FIG. 8. "E" is the push switch 100 of the present embodiment using the pushing member 130-2 illustrated in FIG. 9.

In the Comparative Example, the conventional push switch having the same configuration as the push switch 100 of the present embodiment, except for the pushing member, is used.

As illustrated in FIG. 10, the push switches 100 ("C", "D", "E") of the present embodiment can increase the operational load of the metal contact 120 compared to the conventional push switches ("A", "B"). Also, as illustrated in FIG. 11, the push switches 100 ("C", "D", "E") of the present embodiment can equal or lower the stress amplitude of the first linear edge 123 at the metal contact 120 compared to the conventional push switches.

First Example of Pushing Member Used for Conventional Push Switch

FIG. 12 is a diagram illustrating a first example of a pushing member used for the conventional push switch. As illustrated in FIG. 12, the conventional pushing member 210 has a circular shape in planar view. A bottom surface 210A of the pushing member 210 is circular and planar. That is, the pushing member 210 presses against the top of the metal contact throughout the circular bottom surface 210A.

Second Example of Pushing Member Used for Conventional Push Switch

Figure 13:
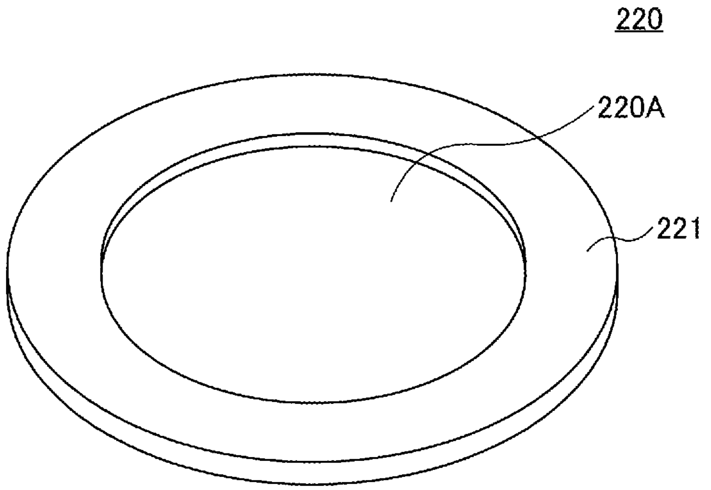
FIG.13 PRIOR ART
FIG. 13 is a diagram illustrating a second example of a pushing member used in the conventional push switch.

FIG. 13 is a diagram illustrating a second example of a pushing member used for the conventional push switch. As illustrated in FIG. 13, the conventional pushing member 220 has a circular shape in a planar view. A bottom surface 220A of the pushing member 220 is circular and planar. A circular pressing portion 221 is formed on the bottom surface 220A along the outer peripheral edge of the bottom surface 220A. The pressing portion 221 protrudes downwardly from the bottom surface 220A and is a portion having a certain thickness from the bottom surface 220A. That is, the pushing member 220 presses against the top of the metal contact throughout the annular pressing portion 221 on the bottom surface 220A.

As described above, the push switch 100 according to an embodiment comprises the case 110 including the housing space 110A having the upper opening and the first fixed contacts 111 provided on the bottom of the housing space 110A; the metal contact 120 disposed in the housing space 110A and coming in contact with the first fixed contacts 111 through deformation by receiving pressure applied from above; and the pushing member 130 disposed on the top of the metal contact 120 and transmitting the pressure to the metal contact 120, wherein the metal contact 120 includes the pair of first linear edges 123 extending linearly, wherein the pushing member 130 includes a plurality of projecting pressing portions 134 disposed on a bottom surface 130B facing the metal contact 120, and wherein the plurality of pressing portions 134 is disposed on the bottom surface 130B at positions not overlapping a straight line SL1 that passes through the center of the metal contact 120 and intersecting each of the pair of first linear edges 123.

Thus, the push switch 100 of the present embodiment can press the metal contact 120 by the pushing member 130 so that an increase in the stress amplitude of the first linear edge 123 of the metal contact 120 is suppressed even when the operational load of the metal contact 120 is increased. Therefore, the push switch 100 of the present embodiment can suppress the generation of cracks or the like in the metal contact 120, and hence can achieve a longer life of the metal contact 120.

While one embodiment of the invention has been described in detail above, the invention is not limited to these embodiments, and various modifications or variations are possible within the scope of the invention as defined in the appended claims.

For example, in the push switch of the present invention, the pushing member may have at least a plurality of pressing portions and may not be side-cut (for example, not having a pair of second linear edges, but circular in a planar view).

Furthermore, the pair of first linear edges 123 of the metal contact 120 is not limited to a straight line in a mathematical sense, and may be rounded to the extent of still appearing to be linear.

What is claimed is:

1. A push switch comprising:

a case including a housing space having an upper opening and including fixed contacts disposed on a bottom of the housing space;

a movable contact member disposed in the housing space configured to deform in response to receiving pressure applied from above, and contacting the fixed contacts upon deforming in response to the received pressure, said movable contact member having a dome shape and being made of a single metal plate; and a pushing member disposed on a top part of the dome shape of the movable contact member at a center of the movable contact member in plan view and configured to transmit the received pressure to the movable contact member, wherein the movable contact member includes a pair of first linear edges that are arranged so as to be line-symmetrical and face each other, and a pair of first curved edges that are arranged so as to be line-symmetrical and face each other so as to define an entire periphery of the movable contact member, wherein the pushing member includes a pair of second linear edges that are arranged to be line-symmetrical and parallel to the pair of the first linear edges, said pushing member further including a plurality of projecting pressing portions disposed on a bottom surface of the pushing member facing the movable contact member, and wherein the plurality of projecting pressing portions are disposed on the bottom surface at positions not overlapping a straight line that passes through the center of the movable contact member and intersecting each of the pair of first linear edges, said plurality of projecting pressing portions being arranged so as to be symmetrical relative to the center of the movable contact member in plan view.

2. The push switch according to claim 1, wherein the pushing member includes the plurality of projecting pressing portions at four corners on the bottom surface of the pushing member, each of the corners having a corresponding projecting pressing portion of the plurality of projecting pressing portions.

3. The push switch according to claim 2, wherein each of the plurality of projecting pressing portions is arranged so as not to be in close contact with each other.

4. The push switch according to claim 1, wherein the pushing member includes a pair of curved edges extending along a same circumference, and wherein a pair of the plurality of projecting pressing portions extends along the pair of curved edges, each of the curved edges having a corresponding projecting pressing portion of the plurality of projecting pressing portions.

5. The push switch according to claim 1, wherein the plurality of projecting pressing portions are symmetrically disposed with respect to the center of the movable contact member.

6. The push switch according to claim 1, wherein the center of the movable contact member is positioned so as to match with a center of the pushing member in plan view.

7. The push switch according to claim 1, wherein the pair of the first linear edges are line-symmetrical relative to an imaginary line, said imaginary line being apart from the pair of the first linear edges with a same distance and parallel to the pair of the first linear edges.

8. The push switch according to claim 1, wherein the pair of the first linear edges has a same length.

9. The push switch according to claim 1, wherein the pushing member is arranged so as to entirely overlap the movable contact member in plan view.

* * * * *